Feb. 26, 1929.
F. W. HOBAN
1,703,273
AMUSEMENT NOVELTY
Filed Nov. 28, 1927
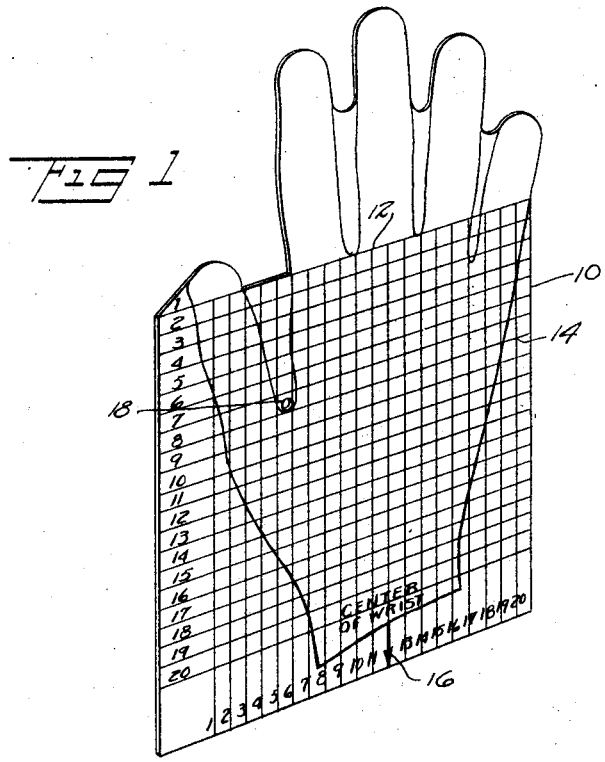
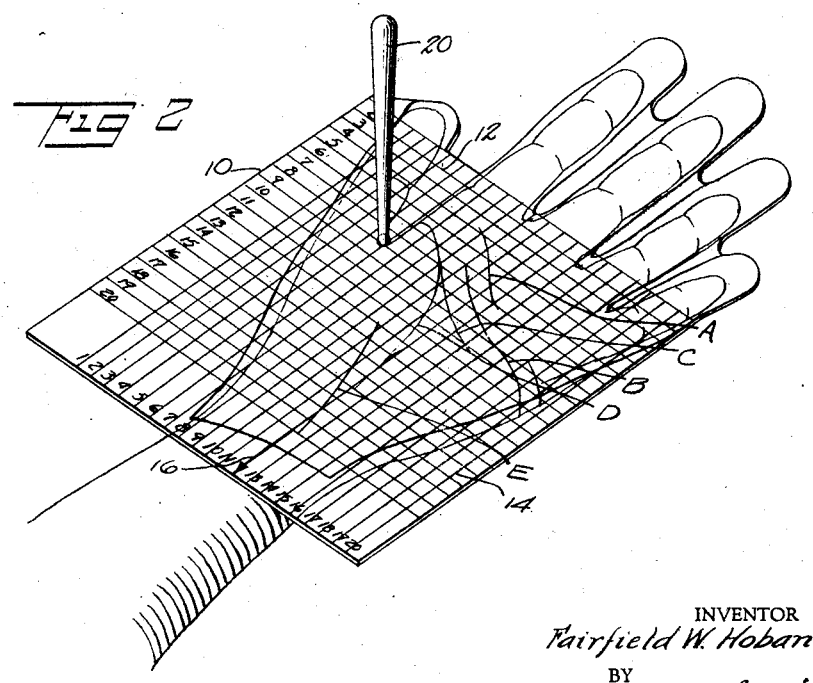
INVENTOR
Fairfield W. Hoban
BY
Dyke and Schainey
ATTORNEYS Patented Feb. 26, 1929.

1,703,273

UNITED STATES PATENT OFFICE.

FAIRFIELD W. HOBAN, OF NEW YORK, N. Y.

AMUSEMENT NOVELTY.

Application filed November 28, 1927. Serial No. 236,310.

My invention relates to means for facilitating the reading of the palm of the hand, and the same has for its object more particularly to provide a simple, novel and cheap device which may be readily placed on the palm to permit of the determination of the characteristics of the several lines thereof, and afford amusement and entertainment to those using the device.

Further, said invention has for its object to provide a device of the character specified in which the surface thereof is calibrated or graduated to form a scale adapted to overlie the lines of the palm for obtaining certain numerical data relating thereto and used to interpret the meaning thereof.

Further, said invention has for its object to provide a device of the character specified in which centering means serves to facilitate the positioning of the device on the palm.

Further, said invention has for its object to provide a diaphanous member which is adapted to be placed on the palm of the hand, and which is divided into a plurality of squares adapted to overlie the lines of the palm for obtaining certain numerical data relating thereto and used to interpret the meaning of the palm lines.

Other objects will in part be obvious, and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawing:

Fig. 1 is a perspective view showing one form of device constructed according to and embodying my said invention, and Fig. 2 is a similar view showing the device applied to the palm.

Referring to the drawing, the device comprises a diaphanous or transparent member 10, composed of celluloid or other diaphanous substance, and, in the embodiment of the invention illustrated, having a contour in part simulating the shape of the hand.

A series of horizontal lines 12 and a series of vertical lines 14 are printed or otherwise formed upon the member 10 dividing the face thereof into squares of the desired size like Cartesian coordinates. For convenience, the horizontal lines 12 are indicated by the numerals 1, 2, 3, etc. formed on the member 10 at the left hand side thereof and beginning at the top thereof. In like manner the vertical lines 14 are indicated by the numerals 1, 2, 3, etc. formed on the member 10 at the base thereof and beginning at the left hand side thereof.

The device is centered or positioned on the palm by a suitable indicator, such as the arrow 16 arranged centrally of the base thereof so that the member may be placed with the arrow 16 at the center of the wrist. Preferably, a suitable notation such as "center of wrist" is associated with the arrow 16 to indicate the function thereof. The device is positioned vertically on the palm by providing an opening or hole 18 therein adapted to receive a member 20 which, when the device is on the palm is adapted to engage the hand between the thumb and the finger adjacent thereto. In use, the device is placed on the hand substantially as shown at Fig. 2. The preferred method of comparing the several palm lines A, B, C, D, E is in accordance with the following example:

The lines A, B and C, being predominantly horizontal, are compared by means of the vertical lines 14. The palm line A lies between the vertical lines numbered 9 and 13, the sum of which numbers is 22. The line B lies between vertical lines numbered 10 and 19, the sum of which numbers is 29. The palm line C lies between the vertical lines numbered 6 and 15, the sum of which numbers is 21. The palm lines D and E being predominantly vertical are compared by means of the horizontal lines 12. The line D lies between the horizontal lines numbered 7 and 16, the sum of which numbers is 23. The line E, lies between the horizontal lines numbered 12 and 20, the sum of which numbers is 32. The values 22, 29, 21, 23 and 32 for the several palm lines A, B, C, D, E, are then added together, giving the sum 127. In a booklet or pamphlet which is supplied with the device 10 there is found a series of numbers representing the sums obtained for different palms in the manner above outlined, and accompanied by appropriate descriptions. For instance, therein under the sum "127" might be found the following description or palm reading:

"127. You will enjoy a long life; a large sum of money awaits you; beware of a blond lady."

The device of my said invention may be readily manipulated and applied to the palm and the calibrations or graduations thereof afford ready means for obtaining the data from the several lines of the palm. The totals obtained of course will vary with the person whose palm is being read, and the printed readings or interpretations, such as the one example "127" indicated above, correspondingly vary, so that an amateur in the art of palm reading may readily read his own or another's palm without resorting to a professional palm reader, and this is accomplished by merely taking the sum obtained as above outlined and referring to the booklet or pamphlet for the interpretation thereof.

The device of my said invention provides a source of amusement and entertainment for social gatherings, and the like. No claim is made, however, that the results obtained have any occult significance.

I claim:

1. A device of the character described, comprising a diaphanous member adapted to be placed on the palm of the hand, and having series of vertical and horizontal lines thereon intersecting each other and subdividing the surface thereof into units for determining the relative lengths of both the horizontally extending and vertically extending lines of the palm exposed to view through said member.

2. A device of the character described, comprising a diaphanous member adapted to be placed on the palm of the hand, and having series of vertical and horizontal lines thereon intersecting each other and subdividing the surface thereof into units for determining the relative lengths of both the horizontally extending and vertically extending lines of the palm exposed to view through said member, and characters associated with said vertical and horizontal lines for numbering the lines of each series successively.

3. A device of the character described, comprising a diaphanous member adapted to be placed on the palm of the hand, and having series of vertical and horizontal lines thereon intersecting each other and subdividing the surface thereof into units for determining the relative lengths of both the horizontally extending and vertically extending lines of the palm exposed to view through said member, and means on said member for centering the same on the palm of the hand.

4. A device of the character described, comprising a diaphanous member adapted to be placed on the palm of the hand, and having vertical and horizontal graduations thereon dividing the surface thereof into squares, and characters arranged in series along vertical and horizontal edge portions of said member and serving to successively number said horizontal graduations and said vertical graduations respectively.

5. A device of the character described, comprising a diaphanous member adapted to be applied to the palm of the hand, and having series of vertical and horizontal lines thereon intersecting each other and subdividing the surface thereof into units of length for determining the relative lengths of both the horizontally extending and vertically extending lines of the palm exposed to view through said member, characters on said member associated with said lines for numbering the lines of each series successively, a mark on said member for indicating the portion thereof to be disposed at the center of wrist, and means thereon for determining the position of the device lengthwise of the hand.

6. A device of the character described, comprising a sheet composed of transparent material and adapted to be applied to the palm of the hand, a series of vertical lines and a series of horizontal lines formed on the surface thereof dividing the same into a plurality of squares, characters formed on the left hand edge of said sheet and extending from adjacent the top thereof towards the base thereof for numbering said horizontal lines successively, characters formed on the base thereof and extending from the left towards the right for numbering said vertical lines successively, and means on said sheet for determining the proper position of the device when the same is applied to the palm.

In testimony whereof, I have signed my name hereto.

FAIRFIELD W. HOBAN.